June 18, 1935.　　　H. E. PRESTON　　　2,005,005
STOKER DRIVE MECHANISM
Filed Sept. 17, 1930　　　9 Sheets-Sheet 1

June 18, 1935.                    H. E. PRESTON                    2,005,005
                              STOKER DRIVE MECHANISM
                       Filed Sept. 17, 1930       9 Sheets-Sheet 3

Fig. 3.

Inventor:-
Herbert E. Preston,
by his Attorneys,
Howson & Howson

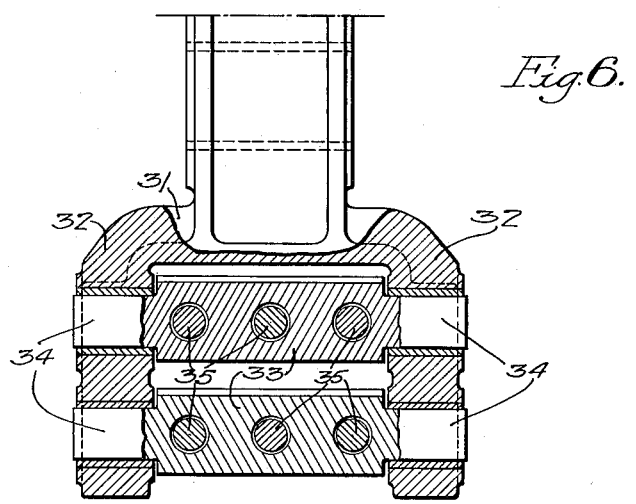
Fig. 6.
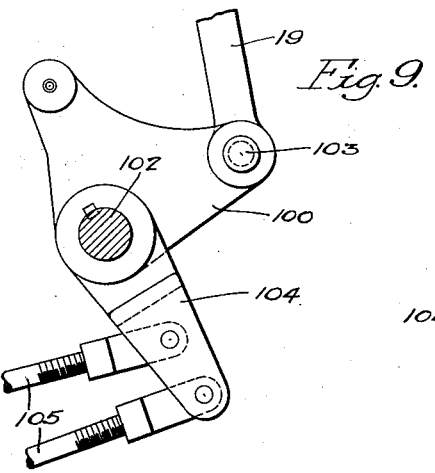
Fig. 9.
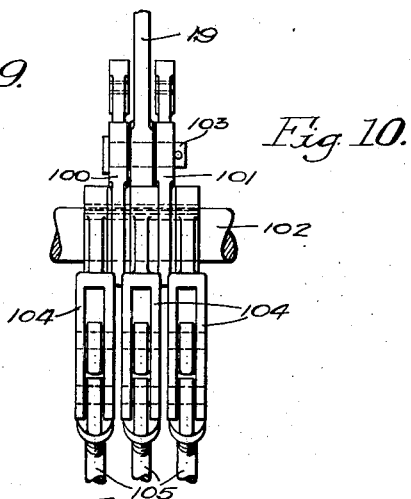
Fig. 10.
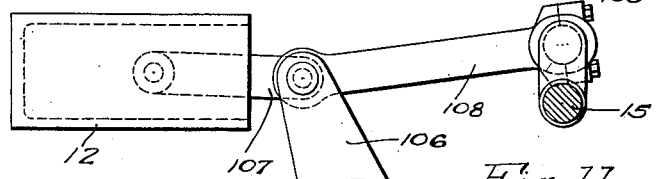
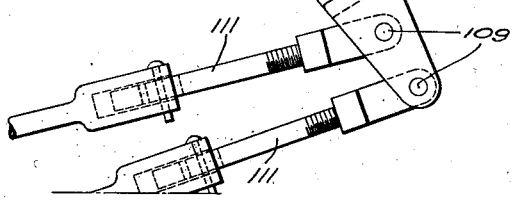
Fig. 11.
Inventor:-
Herbert E. Preston,
by his Attorneys,
Howson & Howson

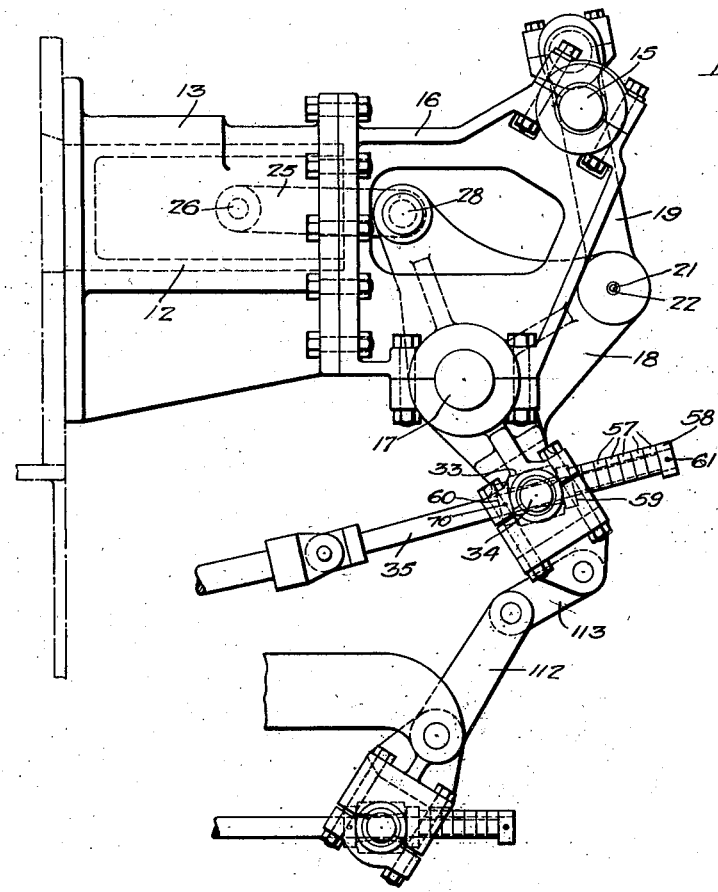
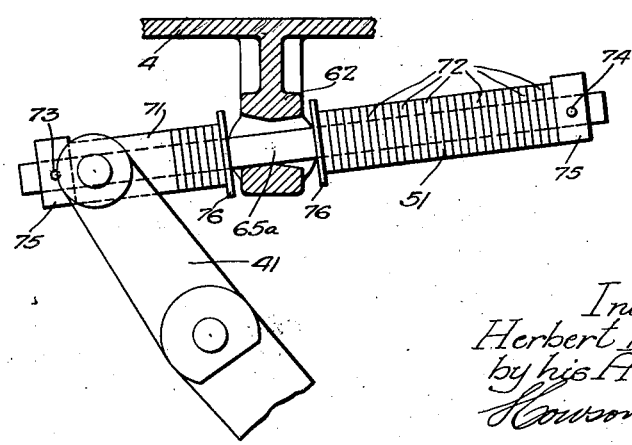

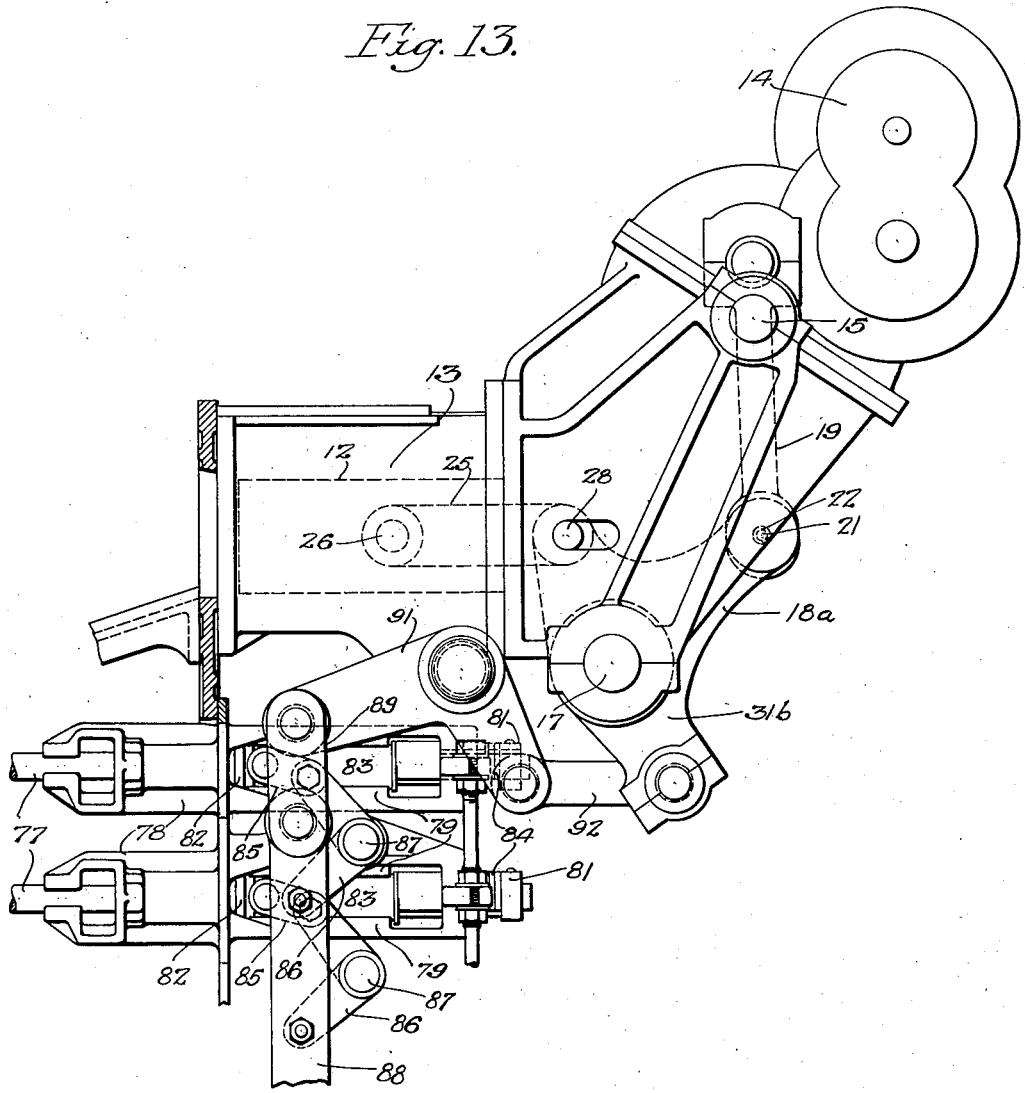

June 18, 1935.  H. E. PRESTON  2,005,005
STOKER DRIVE MECHANISM
Filed Sept. 17, 1930   9 Sheets-Sheet 9

Inventor:-
Herbert E. Preston,
by his Attorneys,
Howson & Howson

Patented June 18, 1935

2,005,005

UNITED STATES PATENT OFFICE 2,005,005

STOKER DRIVE MECHANISM

Herbert E. Preston, Philadelphia, Pa., assignor to American Engineering Company, Philadelphia, Pa., a corporation of Pennsylvania Application September 17, 1930, Serial No. 482,617

6 Claims. (Cl. 110—44)

A principal object of this invention is to provide a mechanical stoker having generally improved fuel-feeding mechanism.

Another object is to provide improved drive means for the fuel-feeding elements of an underfeed stoker affording a maximum flexibility of adjustment and a consequent superior control of the feeding operation.

Still another object is to provide an improved stoker drive wherein the primary and secondary elements are so disassociated as to prevent undesirable reactions adversely affecting the efficiency and durability of the mechanism.

A further object of the invention is to provide a drive connection between the prime mover and the primary fuel-feed ram which substantially eliminates transverse components and restricts the thrust upon the ram to a straight line corresponding to the axis of the cylinder in which the ram operates.

A still further and specific object of the invention is to provide an improved and simplified drive for the fuel-feeding elements of an underfeed stoker affording independent adjustment of the individual elements.

Another object is to provide an adjustable drive of the stated character in which the adjustments may be made from the exterior of the stoker structure.

Still another object of the invention is to provide a transmission mechanism for the rams and pushers of a stoker mechanism which shall be characterized by the inclusion of one or more safety devices preventing damage to the parts, as hereinafter set forth.

The invention further resides in certain novel mechanical and structural features hereinafter set forth and illustrated in the attached drawings, in which:

Figs. 2 and 3 are fragmentary elevational views illustrating details of the mechanism and showing certain of the operating parts in alternative positions;

Fig. 6 is a sectional view on the line 6—6, Fig. 2;

Figs. 7 and 8 are fragmentary enlarged sectional views illustrating details of the mechanism;

Fig. 9 is a fragmentary sectional view illustrating a modification within the scope of the invention;

Fig. 10 is the front view of the mechanism shown in Fig. 9;

Fig. 11 is a sectional elevational view illustrating a further embodiment of the invention; and Figs. 12, 13 and 14 are side elevational views illustrating still other modifications within the scope of the invention.

With reference to the drawings, I indicates the front wall of a furnace equipped with an underfeed stoker of well known type. This stoker comprises an inclined grate made up of alternating retorts, 2, and tuyère sections, 3, said retorts comprising secondary fuel-feeding means in the form of pushers 4 by means of which the fuel is advanced from the top to the bottom of the retort in accordance with the well known principles of operation of this type of apparatus. At the bottom, the grate structure, as outlined above, includes an extension grate 5 which also is adapted to be reciprocated in well known manner. The grate terminates in an ash pit 6; and beneath the inclined grate structure is a space 9 into which combustion air is forced from suitable blower apparatus (not shown), and from which the air passes through the tuyères 3 to the fuel bed.

Figure 2:
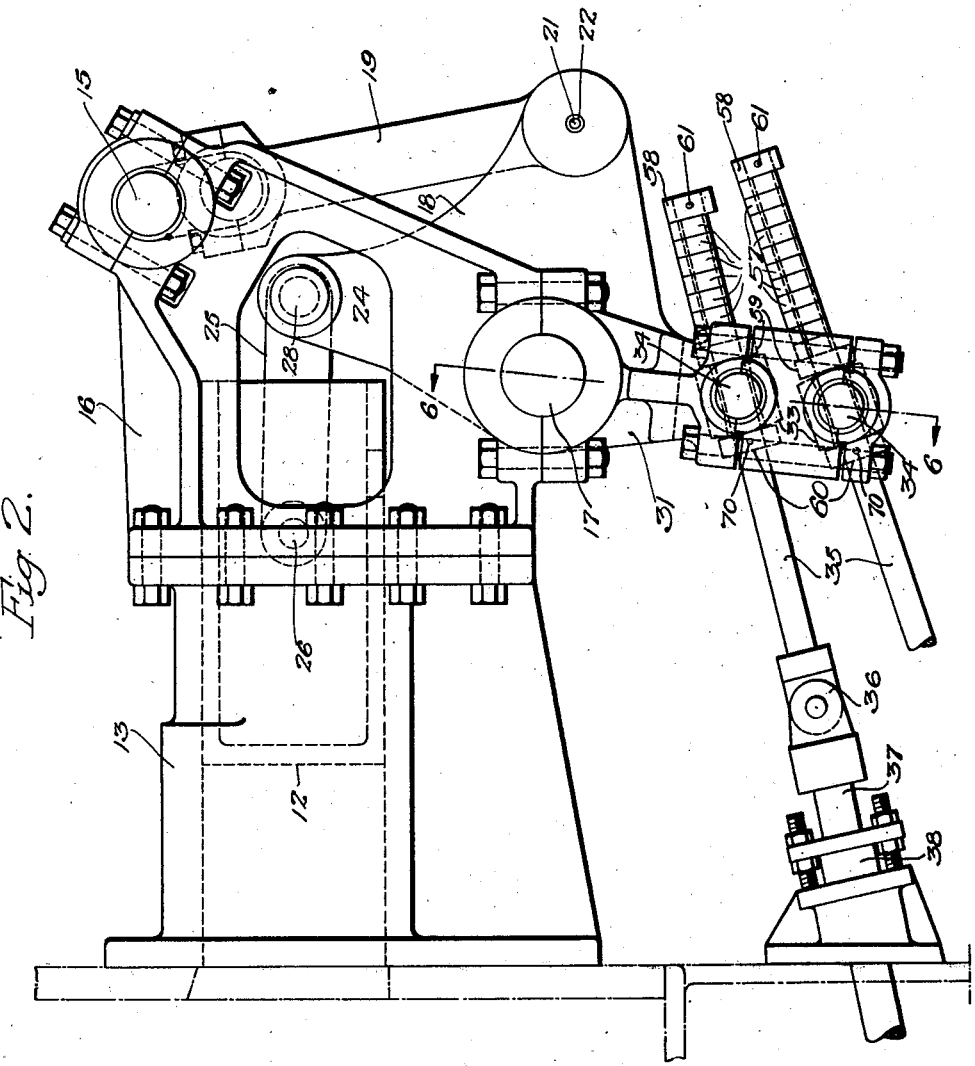

Fuel is fed to the upper ends of the retorts from hoppers 11 through the medium of main fuel rams 12, see Figures 2 and 3, which operate in cylinders 13 with which the hoppers 11 communicate. By means hereinafter set forth, the main rams 12 are reciprocated in the cylinders in such manner as to force predetermined quantities of fuel, emptying into the cylinders 13 from the hoppers 11, into the upper ends of the retorts 2 in which the fuel is advanced by the secondary pushers 4 at a predetermined rate towards the bottom of the grate structure. During this movement, the fuel is consumed until at the bottom the remnants and ashes are passed to and over the extension grate into the ash pit 6.

The actuating means for the ram 12 and pushers 4 may consist of any suitable form of motor (not shown) which in the present instance is connected through power gearing 14 to a main crank shaft 15 journaled at the front of the stoker outwardly of the ram cylinders, as illustrated. Each of the ram cylinders 13 has connected to the outer end thereof a bracket 16, in the upper part of which the crank shaft 15 is journaled, see Figs. 2 to 5, inclusive. In the embodiment of my invention illustrated in Figs. 1 to 6, each of these brackets also comprises bearings 17 in which is journaled a bell crank lever 18, one arm of which is connected through a rod 19 with a crank arm of the shaft 15. Preferably, the rod 19 is connected to the bell crank through the medium of a pin 21 which is adapted to shear under a predetermined strain, this pin thereby constituting a safety feature, as hereinafter set forth in greater detail. The pin 21 preferably is mounted in steel bushings 22 forming a part of the connecting rod and of the bifurcated arm 23 of the bell crank, between which bifurcations the connecting rod is secured.

Another arm 24 of the bell crank lever is connected through a link 25 to the ram 12, the axis of the pivotal connection 26 between the ram and the said link preferably extending through or adjacent to the center of mass of the said ram. For this purpose, the ram is made hollow at its rearward end, the link extending into the hollow interior as illustrated. It will be noted that the arc described by the outer end of the arm 24 and by the pin 28 which connects the link 25 to the bell crank corresponds closely to the extension of the longitudinal axis of the ram 12 and of the cylinder 13 in which the ram operates. The deviation from this axis of the line of movement of the pin 28 is so slight as to afford what in effect is a straight line thrust between the bell crank and the ram 12, substantially devoid of transverse components, whereby wear between the ram and the ram cylinder due to such component thrusts is reduced to a minimum.

Figure 4:
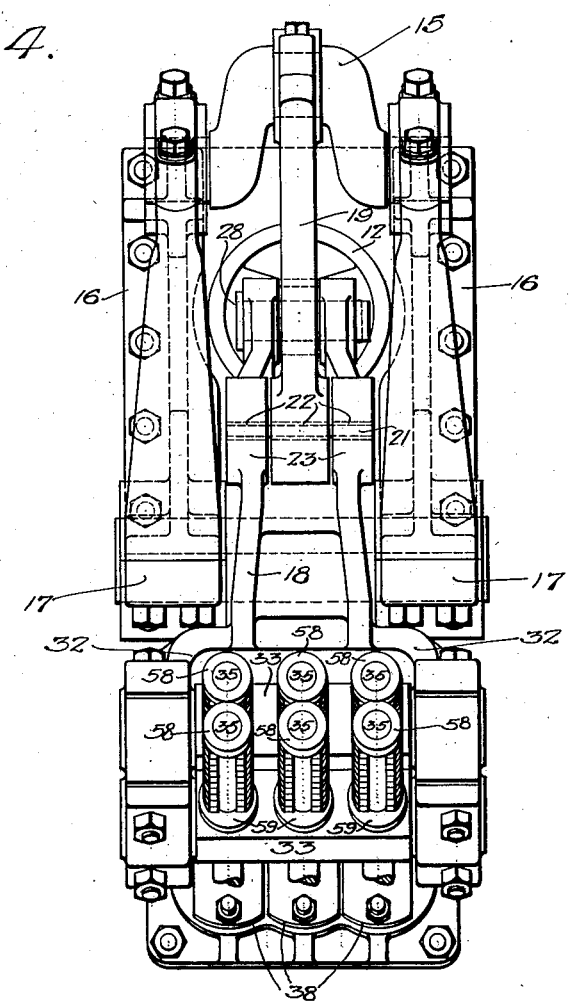
Fig. 4 is a front elevational view of a portion of the mechanism forming a part of the present invention.
Figure 5:
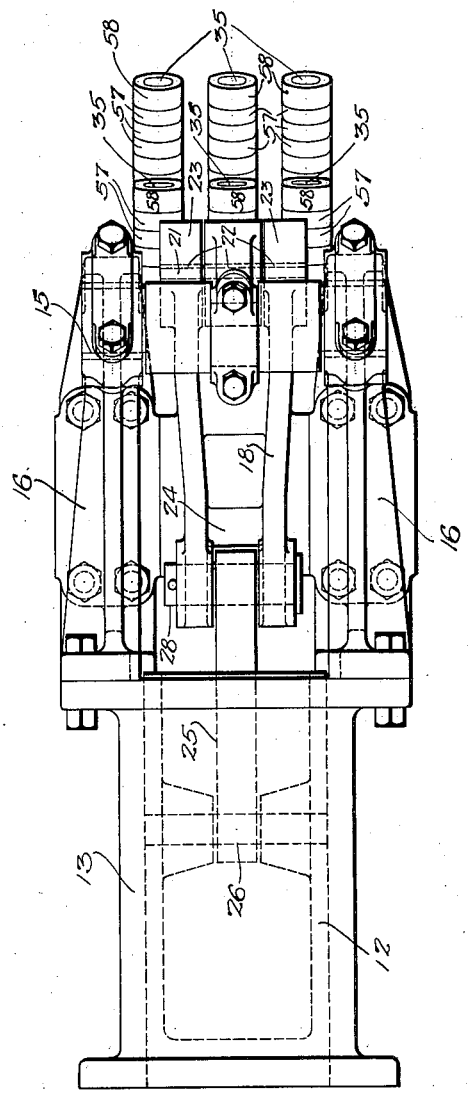
Fig. 5 is a plan view of that portion of the mechanism illustrated in Fig. 4.

The bell crank 18 also comprises a depending arm 31, the bifurcations 32 of which, see Fig. 4, are spaced to admit blocks 33, 33 having trunnions 34 journaled in bearings in the bell crank bifurcations. The blocks 33 are apertured for reception of push rods 35, each of the blocks having in the present instance three such apertures through which extend a corresponding number of the rods. The rods 35 are individually connected through swivel connections 36 with a corresponding number of rods 37 each slidably supported and guided in the front wall 1 of the stoker, means being provided in the form of packing boxes 38 for sealing the joints between the rods and the wall. The rods 37 are in turn individually connected, each through a connecting rod 39 and a pivoted lever 41, to the secondary rams 4, of which in the present instance there are five, and to the extension grate 5. Thus each of the secondary rams 4 and extension grate 5 has an individual connection through the rods 35 with the bell-crank 18.

It will be noted by reference to Figs. 2 to 5, inclusive, that the outer ends of the rods 35 project beyond the blocks 33 to provide for reception of a plurality of horseshoe washers 57 which in the illustrated instance are confined between a collar 58 at the outer end of each of the rods and a washer 59 which abuts the forward convexed face of the trunnion block 33. The opposite similarly convexed face of the trunnion block is engaged in each instance by a collar 60, which is suitably connected, as for example by a shear pin 70, to its respective rods. The horseshoe washers 57 being detachable constitute a means for regulating the amount of lost motion between the arm 31 of the bell crank and the rods 35, and also for adjusting to some extent the position of the path of travel of the secondary rams within their individual guides. Preferably, the collars 58 are secured to their respective rods by means of pins 61 which, like the pins 70 are adapted to shear under a predetermined strain to thereby afford a factor of safety in the event that undue strains are placed upon the mechanism. It will be noted that the apertures in the blocks 33 through which the rods extend are flared toward each end, this with the convexed face formation, which gives line contact between the block and the washer 59 and collar 60, providing for free self-adjustment between the blocks and rods for the changing relative angular positions.

Figure 1:
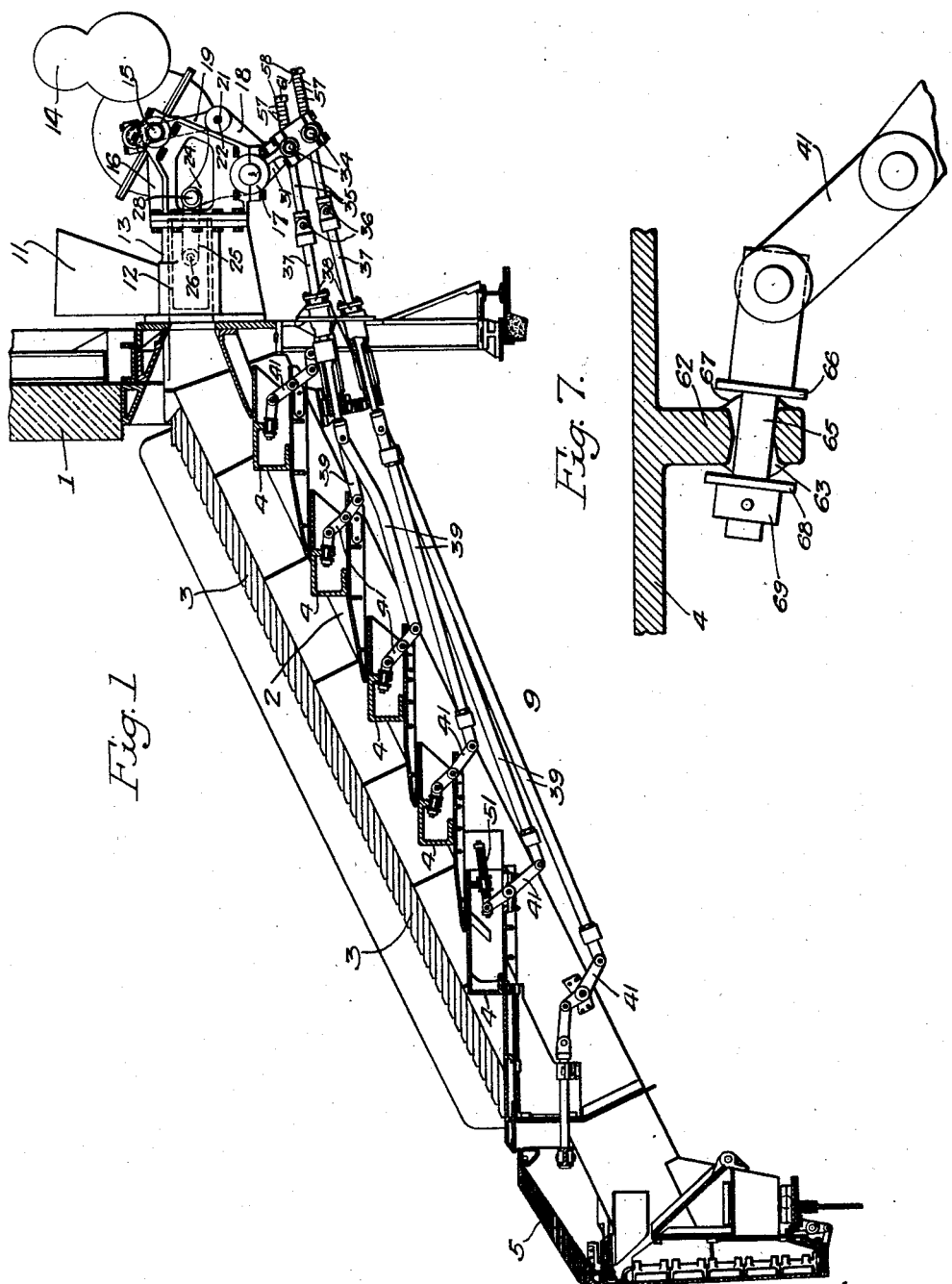
Figure 1 is a more or less diagrammatic vertical sectional view through a mechanical stoker of the underfeed type illustrating an embodiment of my invention.

Further adjustments of the secondary rams and of the extension grate with respect to the actuating mechanism and to each other may be had when desired by means of an adjustable connection between the levers 41 and the rams or grate such as illustrated at 51 in Fig. 1 and in Fig. 8. As shown in Fig. 7, each of the pushers 4 has a depending lug 62 apertured at 63 for reception of a rod 65 constituting a pivoted end portion of the associated lever 41. Each of the rods 65 carries a washer 66 which abuts a shoulder at the inner end of the rod and engages a spherical projection 67 on one face of the lug 62, while a second washer 68, confined to the rod by a collar 69 on the outer end thereof, engages a corresponding projection on the opposite face of the lug. By reason of the flared formation of the ends of the apertures 63 and the spherical projections 67, the rods 65 are freely adjustable in the lugs as required by the changing angularities of the levers 41. In the adjustable connection 51, referred to above, see Fig. 8, the rod, 65a, is elongated and is slidably supported in a trunnion block 71 pivotally supported in the bifurcated end of the lever 41. The extra length of the rod provides for application thereto of horseshoe or other suitable washers 72. The rod carries at its extremities, secured thereto preferably by shear pins 73 and 74, collars 75 which confine the block 71 and the washers 72 and, between these elements, the lug 62 of the pusher. Washers 76 are provided for engagement with the opposite faces of the said lugs. By varying the position of the lug longitudinally of the rod, as determined by the disposal of washers, the position of the path of travel of the pusher in its guides may be varied; and by removing a number of the washers the extent of travel of the pusher may also be varied as required.

The aforedescribed transmission mechanism not only affords a highly flexible control of the action of the secondary fuel-feeding means, but disassociates the primary and secondary rams in a manner and to an extent precluding possibility of the one affecting the operation of the other. The prior practice of operating the primary and secondary rams in series from the prime mover places heavy reaction loads upon the primary rams tending to cock the latter in their cylinders and giving rise to rapid destructive wear in these parts. The present arrangement, in effect, provides independent driving connections for the primary and secondary rams and eliminates the undesirable and destructive inter-reaction thrusts. This in conjunction with the substantial elimination of transverse components in the operation of the main rams, as previously set forth, reduces wear in the rams and their cylinders to a minimum and affords a mechanism of great durability. A close fit between the rams and their cylinders is continuously maintained and sifting of fuel between these parts is largely prevented.

Attention is directed to the applicant's use of a plurality of shear pins which afford a substantially complete protection for the mechanism in event of the jamming of any of the moving parts. The pin 21 connecting the main connecting rod 19 to the bell crank affords protection to the power gearing 14 in the event of obstruction interfering with the movement of either the main feed ram or of the secondary pushers, the location of the pins 21 between the connecting rod and the bell cranks being a particularly desirable one where, as frequently occurs, several of the primary rams of the stoker are driven from a single power box. In addition to the pin 21, each of the connections between the bell crank and the rods extending to the secondary pushers is protected through the shear pins 61 and 70, and still further protection is afforded in the use of the shear pins 73 and 74 in the connection between the pushers and the various pusher-actuating levers.

There may, of course, be many modifications without departure from the invention. In Figs. 9 and 10, for example, I have illustrated a composite lever that may be used to replace the bell-crank 18. This lever consists of two bell-cranks 100 and 101 which are keyed to a shaft 102, the latter in assembly being journaled in the bearings 17. In this instance the rod 19 is connected by a pin 103 to one arm of each of the levers 100 and 101, while the other arms may be connected to the link 25. Also keyed to the shaft 102 are three arms 104, to each of which, in the present instance are pivotally connected two rods 105 which correspond to the rods 35 of the previously described embodiment and which extend to the pushers as previously set forth.

In Fig. 11 is illustrated another embodiment of my invention in which the bell crank 18 is replaced by a simple lever 106 the upper end of which is connected through rods 107 and 108 to the main ram 12 and to the crank shaft 15 respectively. The lower end of this lever may be bifurcated for connection therewith through the medium of pins 109 of the required number of pusher rods 111, which in turn are connected as previously set forth to the secondary rams.

In the embodiment shown in Fig. 12, the bell crank lever 18 is retained but instead of connecting the entire set of secondary ram rods directly thereto, certain of these rods are connected to a simple lever 112 which is connected through a link 113 to the lower arm of the bell crank. This system might be extended by the addition of still other levers for additional rods or for a more favorable distribution of the rods originally employed.

In Fig. 13, I have illustrated the application of the aforedescribed bell crank drive to pusher-operating mechanism of the type disclosed in my copending application, Serial Number 425,316, filed Feb. 1, 1930. In this instance, the pushers (not shown) are connected with rods 77 each of which, like those shown, is slidably mounted in suitable guides 78 on the fixed frame of the stoker mechanism. The rods extend outwardly at the front of the stoker through outer guides 79 and have fixed to their ends collars 81, and at a point inwardly of said end, a second collar 82. A cross head 83 surrounds each of the rods 77 and is adapted for reciprocation in the outer guide 79, and provision is made for applying to the rods a plurality of removable washers 84 by means of which the lost motion between the cross head and the rod may be regulated as required. The cross head is connected through a link 85 with a bell crank 86 pivotally connected at 87 to the fixed structure of the stoker and having its other end connected with a rod 88 which through a link 89, a second bell crank lever 91 and a connecting rod 92 is connected to the lower depending arm 31b of the main bell crank. Movement of the bell crank 18a as described above is transmitted through the rod 92, bell crank 91 and link 89 to the rod 88, and thence through the bell cranks 86 and links 85 to the cross heads 83. Reciprocation of the cross heads results in a movement of the rods 77 and of the pusher connected therewith.

Figure 14:
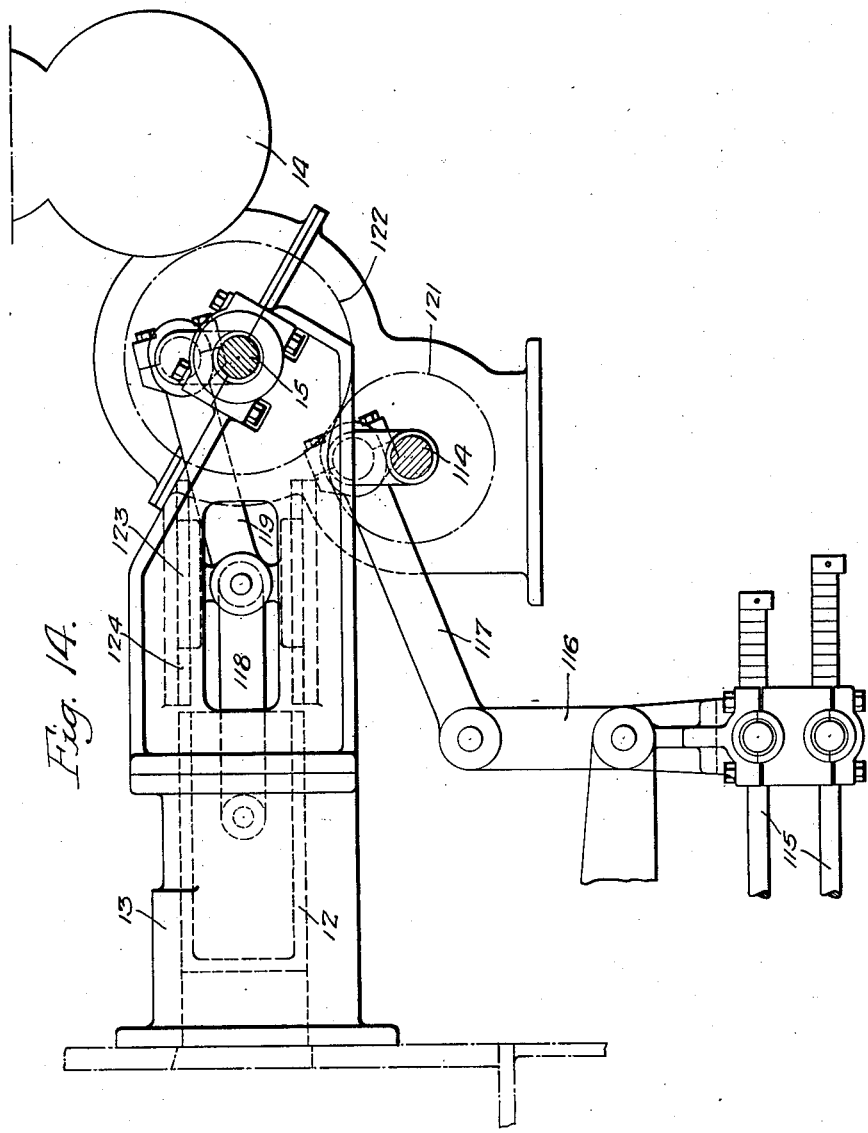

While the use of a suitable lever interposed between the main and secondary rams constitutes a desirable embodiment of my invention, as set forth above, there may be other embodiments such for example, as that shown in Fig. 14. In this instance I employ an auxiliary crank shaft 114 to which the secondary ram rods 115 are connected through the medium of a lever 116 and a connecting rod 117, the main ram 12 being connected through rods 118 and 119 to the main crank shaft 15. In the present instance the auxiliary crank shaft is connected to the main shaft and to the prime mover by gearing 121—122, this simplifying synchronization of the ram actions, although separate power sources may be employed for the two shafts without departure from the invention. In this instance, also, a crosshead 123 is used between the rods 118 and 119, this crosshead reciprocating in guides 124 and insuring an absolutely straight line thrust upon the main ram free from transverse components. It will be noted that this embodiment retains all the advantages of those previously described.

There may be further modification without departure from the invention.

I claim:

1. In a stoker, the combination with a retort including a plurality of fuel feeding elements, of a ram for feeding fuel into said retort, a front wall, a lever mounted outwardly of said wall, a link connecting said lever to said ram at a point substantially along the longitudinal center line of the latter, said parts being so disposed that upon oscillation of said lever a substantially straight line motion is imparted to said ram, an actuating rod for each of said fuel feeding elements, said rods extending through bearings provided in said front wall, a second rod pivotally connected to the outer end of each of said first mentioned rods, a member pivotally mounted in said lever on an axis transversely to the plane in which said lever oscillates, apertures provided in said member through which said last mentioned rods extend, means for preventing displacement of said rods from said apertures, and means for actuating said lever.

2. In a stoker, the combination with a retort including a plurality of fuel feeding elements, of a ram for feeding fuel into said retort, a front wall, a lever mounted outwardly of said wall, means pivotally connecting the said lever to said ram at a point substantially along the longitudinal center line of the latter, whereby upon oscillation of said lever a substantially straight line motion is imparted to said ram, an actuating rod for each of said fuel feeding elements, said rods extending through bearings provided in said front wall, a second rod pivotally connected to the outer end of each of said first mentioned rods, a member pivotally mounted in said lever on an axis transversely to the plane in which the lever oscillates, apertures provided in said member through which said last mentioned rods extend, means for preventing displacement of said rods from said apertures, and means for actuating said levers.

3. In a stoker, the combination with a retort including a plurality of fuel feeding elements, of a ram for feeding fuel into said retort, a front wall, a lever mounted outwardly of said wall, a link connecting said lever to said ram at a point substantially along the center line of the latter, said parts being so disposed that upon oscillation of said lever a substantially straight line motion is imparted to said ram, an actuating rod for each of said fuel feeding elements, said rods extending through bearings provided in said front wall, a second rod pivotally connected to the outer end of each of said first mentioned rods, a member pivotally mounted in said lever on an axis transversely to the plane in which the lever oscillates, apertures provided in said member through which said last mentioned rods extend, collars mounted on each of said last mentioned rods preventing displacement of the latter from said apertures, said collars being spaced apart to permit lost motion between said rods and said member, and a plurality of washers adapted to be detachably mounted on said rods intermediate the collars to thereby regulate the extent of said lost motion, and means for actuating said lever.

4. In a stoker, the combination with a retort including a plurality of fuel feeding elements, of a ram for feeding fuel into said retort, a cylinder for said ram, a pivoted lever, means extending into one end of said cylinder only, and connecting said lever to said ram at a point substantially along the longitudinal center line of the latter, whereby upon oscillation of said lever a substantially straight line motion is imparted to said ram, rods constituting connecting links between said lever and said fuel feeding elements and mounted for longitudinal reciprocation by oscillation of said lever, a member pivotally mounted in said lever on an axis transversely to the plane in which the lever oscillates, said member being apertured transversely to the pivotal axis thereof and said rods passing loosely through said apertures, means for preventing displacement of the rods from the apertures, and means for actuating said lever.

5. In a stoker, the combination with a retort including a plurality of fuel feeding elements, of a ram for feeding fuel into said retort, a front wall, a lever mounted outwardly of said wall, means connecting said lever to said ram at a point substantially along the longitudinal center line of the latter, whereby upon oscillation of said lever a substantially straight line motion is imparted to said ram, rods constituting connecting links between the lever and said fuel feeding elements, said rods extending through bearings provided in said front wall, a member pivotally mounted in said lever on an axis transversely to the plane in which said lever oscillates, said member being apertured transversely to the pivotal axis thereof, and said rods passing loosely through said apertures, means for preventing displacement of said rods from said apertures, and means for actuating said lever.

6. In a stoker, the combination with a retort including a plurality of fuel feeding elements, of a ram for feeding fuel into said retort, a cylinder for said ram, a pivoted lever, means comprising one or more links extending into one end of said cylinder only, and connecting said lever to said ram at a point substantially along the longitudinal center line of the latter, whereby oscillation of said lever imparts a substantially straight line motion to said ram, rods connecting said lever to said fuel feeding elements, a member pivotally mounted in said lever on an axis transversely to the plane in which said lever oscillates, said member being apertured transversely to the pivotal axis thereof, and said rods passing loosely through said apertures, collars mounted on each of said rods for preventing displacement of the rods from the apertures, said collars being spaced apart to permit lost motion between the rods and the apertured member, a plurality of washers detachably mounted on said rods intermediate the collars to thereby regulate the extent of said lost motion, and means for actuating said lever.

HERBERT E. PRESTON